US010094359B2

(12) United States Patent
Olesen

(10) Patent No.: US 10,094,359 B2
(45) Date of Patent: Oct. 9, 2018

(54) IMPROVEMENTS RELATING TO WIND TURBINES

(71) Applicant: VESTAS WIND SYSTEMS A/S, Aarhus N (DK)

(72) Inventor: Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 501 days.

(21) Appl. No.: 14/893,145

(22) PCT Filed: May 21, 2014

(86) PCT No.: PCT/DK2014/050140
§ 371 (c)(1),
(2) Date: Nov. 23, 2015

(87) PCT Pub. No.: WO2014/187463
PCT Pub. Date: Nov. 27, 2014

(65) Prior Publication Data
US 2016/0131111 A1 May 12, 2016

(30) Foreign Application Priority Data
May 23, 2013 (DK) .............. PA 2013 70277

(51) Int. Cl.
F03D 7/02 (2006.01)
F03D 1/06 (2006.01)
F03D 17/00 (2016.01)

(52) U.S. Cl.
CPC ......... F03D 1/0675 (2013.01); F03D 7/0228 (2013.01); F03D 17/00 (2016.05);
(Continued)

(58) Field of Classification Search
CPC .......... F03D 1/0675; F03D 17/00; F03D 7/00; F03D 7/0224; F03D 7/0228; F03D 7/02;
(Continued)

(56) References Cited

U.S. PATENT DOCUMENTS

2006/0051207 A1* 3/2006 Becerra .................. F03D 1/065
416/5
2010/0002129 A1 1/2010 Sandvad
(Continued)

FOREIGN PATENT DOCUMENTS

EP 2327876 A1 6/2011
EP 2511522 A1 10/2012
(Continued)

OTHER PUBLICATIONS

International Search Report for PCT/DK2014/050140, dated Jul. 28, 2014.
Danish Search Report for PA 2013 70277, dated Dec. 20, 2013.

Primary Examiner — Justin Seabe
Assistant Examiner — Joshua R Beebe
(74) Attorney, Agent, or Firm — Patterson + Sheridan, LLP

(57) ABSTRACT

The present invention relates to a method and to a wind turbine for determining the tip angle of a blade of a wind turbine rotor during rotation of the rotor. The method comprising: (a) transmitting a light signal from a first blade of the wind turbine rotor towards a second blade of the rotor; (b) receiving the light signal at the second blade of the rotor; and (c) calculating the tip angle of the first or second blade based upon characteristics of the received light signal.

41 Claims, 8 Drawing Sheets

(52) U.S. Cl.
CPC ....... *F05B 2240/30* (2013.01); *F05B 2260/72* (2013.01); *F05B 2270/1033* (2013.01); *F05B 2270/1095* (2013.01); *F05B 2270/328* (2013.01); *F05B 2270/804* (2013.01); *Y02E 10/721* (2013.01); *Y02E 10/723* (2013.01)

(58) Field of Classification Search
CPC . Y02E 10/723; Y02E 10/721; F05B 2270/33; F05B 2270/80; F05B 2270/8041; F05B 2270/804; F05B 2270/8042; F05B 2270/809; F05B 2270/328; F05B 2270/1095; F05B 2270/1033; F05B 2260/72; F05B 2240/30
See application file for complete search history.

(56) References Cited

U.S. PATENT DOCUMENTS

| | | | | |
|---|---|---|---|---|
| 2010/0021298 | A1* | 1/2010 | Sandvad | F03D 7/047 416/1 |
| 2011/0020651 | A1 | 7/2011 | Jang et al. | |
| 2012/0229792 | A1* | 9/2012 | Fuglsang | F03D 7/0224 356/28 |
| 2013/0307961 | A1* | 11/2013 | Puigcorbe Punzano | F03D 11/0091 348/82 |
| 2014/0054894 | A1* | 2/2014 | Olesen | F03D 11/0091 290/44 |
| 2014/0286776 | A1* | 9/2014 | Gao | F03D 7/0224 416/155 |
| 2015/0085297 | A1* | 3/2015 | Hughes | G01S 17/42 356/482 |
| 2015/0240787 | A1* | 8/2015 | Byskov | F03D 17/00 416/1 |
| 2015/0322925 | A1* | 11/2015 | Klitgaard | F03D 17/00 416/1 |

FOREIGN PATENT DOCUMENTS

| | | |
|---|---|---|
| GB | 2465790 A | 6/2010 |
| WO | 2009143849 A2 | 12/2009 |
| WO | 2009143850 A2 | 12/2009 |

* cited by examiner

IMPROVEMENTS RELATING TO WIND TURBINES

BACKGROUND

Modern utility-scale wind turbines have rotors comprising very long, slender blades. FIG. 1 shows a typical wind turbine blade 10, which tapers longitudinally from a relatively wide root end 12 towards a relatively narrow tip end 14. A longitudinal axis L of the blade is also shown in FIG. 1. The root end 12 of the blade is circular in cross section. Outboard from the root, the blade has an airfoil profile 16 in cross section. The root of the blade is typically connected to a hub of the rotor via a pitch mechanism, which turns the blade about the longitudinal pitch axis L in order to vary the pitch of the blade.

Varying the pitch of a blade varies its angle of attack with respect to the wind. This is used to control the energy capture of the blade, and hence to control the rotor speed so that it remains within operating limits as the wind speed changes. In low to moderate winds it is particularly important to control the pitch of the blades in order to maximise the energy capture of the blades and to maximise the productivity of the wind turbine.

The energy capture of a wind turbine blade generally increases moving from the root towards the tip. Hence, the inboard or root part 12 of the blade 10 tends to capture the least energy, whilst the outboard or tip part 14 of the blade tends to capture the most energy. Precise control over the pitch angle of the outboard part of the blade is therefore desirable in order to maximise the output of the wind turbine.

Modern wind turbine blades are typically 50-80 meters in length, or longer in some cases, and are generally made from composite materials such as glass-fibre reinforced plastic (GFRP). The blades are therefore relatively flexible and inevitably bend and twist to an extent during operation. The relatively narrow outboard part of the blade is particular susceptible to twisting and bending.

Whilst the pitch mechanism allows precise control over the angle of the root of the blade, this does not necessary reflect the angle of the tip of the blade, which is more susceptible to bending and twisting as described above. The present invention provides a method and apparatus for measuring the angle of the blade tip accurately so that this information can be employed in control strategies. For example, accurate measurements of the tip angle can be employed in pitch control strategies allowing precise control over the angle of attack of the outboard part of the blade so that the energy capture of the blade can be maximised. The measurements may also be employed in blade load calculations and control strategies for protecting the blades from extreme loads.

The tip angle of the blade is defined herein as the angle between the chord line of the blade at the tip and a reference axis in a plane perpendicular to the longitudinal axis L of the blade, as will now be described by way of example with references to FIGS. 2a and 2b. The chord line is the straight line D connecting the leading edge 18 of the blade to the trailing edge 20 of the blade 10.

FIGS. 2a and 2b illustrate a cross-section of the tip of the wind turbine blade 10 in a plane perpendicular to the longitudinal axis L and taken along the line A-A in FIG. 1. In FIG. 2a the blade 10 has a first tip angle, whilst in FIG. 2b the blade 10 has a second tip angle. The tip angle is marked $\theta$ in FIGS. 2a and 2b. The longitudinal axis L is perpendicular to the plane of the page in FIGS. 2a and 2b.

The L-y plane defines the plane of rotation of the rotor blades, and the x-axis is perpendicular to this plane. The direction of rotation of the blade 10 about a rotor axis is indicated by R in FIGS. 2a and 2b, which traces a circle in the L-y plane when the blade is rotated through an angle of $2\pi$ radians. The wind direction is indicated as W in FIGS. 2a and 2b. In FIGS. 2a and 2b the wind direction is illustrated as being perpendicular to the L-y plane, although in practice the direction of the wind relative to the L-y plane varies, and may be incident at different angles. In FIG. 2a the blade tip angle $\theta$ is defined as 0 radians when the chordline D is parallel to the x-axis, and therefore perpendicular to the L-y plane.

FIG. 2b illustrates the blade tip turned through an angle $\theta$ with respect to the x-axis.

In the subsequent discussion of the invention, the above definition of the blade tip angle will be applied. In other words, the blade tip angle $\theta$ is defined with respect to an axis (the x-axis of FIGS. 2a and 2b) formed perpendicular to the plane of rotation (the L-y plane of FIGS. 2a and 2b) of the blade. However, it will be appreciated that the tip angle could be defined relative to another arbitrary reference and so this definition should not be accepted as unduly limiting to the scope of the present invention.

Modern wind turbines are very tall structures, and the blades are particularly susceptible to lightning strikes. Therefore, most wind turbine blades incorporate lightning protection systems for conducting the electrical energy from lightning strikes safely to ground. The present invention aims to avoid the use of metal parts or electrical components on wind turbine blades as these can attract lightning strikes in preference to the lightning receptors on the blade, which may cause damage to the blade.

SUMMARY OF THE INVENTION

Against this background, a first aspect of the present invention provides a method of determining the tip angle of a blade of a wind turbine rotor during rotation of the rotor. The method comprises the steps of:
(a) transmitting a light signal from a first blade of the wind turbine rotor towards a second blade of the rotor;
(b) receiving the light signal at the second blade of the rotor; and
(c) calculating the tip angle of the first or second blade based upon characteristics of the received light signal.

The use of a light signal enables the tip angle of the blade to be determined with a high level of accuracy.

Step (a) may comprise transmitting the light signal from a transmitter located near the tip of the first blade, improving the accuracy of the determined blade tip angle.

Step (b) may comprise receiving the light signal at a receiver located near the tip of the second blade. This configuration improves the accuracy of the determined blade tip angle.

Preferably, light is communicated to the transmitter from a remotely-located light source via a first optical fibre extending longitudinally along the first blade.

In certain embodiments the received light signal is communicated to a remotely-located detector via a second optical fibre extending longitudinally along the second blade. The light source and the detector may conveniently be located in the hub or elsewhere away from the blade. The use of optical fibres avoids electrically conducting apparatus within the blade, which may attract lightening in adverse weather conditions.

In certain embodiments step (a) comprises transmitting first and second substantially identical light signals respectively from first and second transmitters, the first and second transmitters being located near the tip of the first blade and spaced apart in the chordwise direction of the first blade; and step (c) comprises calculating the tip angle of the first blade. Within the present context substantially identical light signals relates to coherent and substantially monochromatic light signals.

Step (b) may comprise receiving the transmitted light signal at first and second receivers, the first and second receivers being located near the tip of the second blade and spaced apart in the chordwise direction of the second blade; and step (c) comprises calculating the tip angle of the second blade. Preferably, the received light signal is converted into first and second substantially identical light signals.

Step (c) may comprise determining the optical path difference between the first and second signals and using the optical path difference to calculate the tip angle. An optical path difference present between the first and second signals will result in an interference signal, wherefrom the blade tip angle may be calculated.

Step (a) may comprise continuously varying the frequency of the transmitted light signal from a first frequency to a second frequency; and step (b) may comprise detecting a blinking interference signal caused by constructive and destructive interference occurring between the first and second light signals as the frequency is varied between the first and second frequencies. The blade tip angle is then calculated in step (c) based upon characteristics of the interference signal detected in step (b).

Step (c) may comprise counting the number of blinks that occur in the interference signal when the frequency is varied from the first frequency to the second frequency and calculating the blade tip angle based upon the counted number of blinks. Each blink is associated with an amplitude peak of the interference signal. Accordingly, it is possible to determine the change in the number of wave cycles associated with varying the frequency from the first frequency to the second frequency, wherefrom the total optical path difference may be determined. This enables calculation of the blade tip angle.

Alternatively, step (c) may comprise determining the blinking frequency of the interference signal and calculating the blade tip angle based upon the blinking frequency.

In certain embodiments step (a) comprises transmitting a spectrum of light from the first blade towards the second blade; step (b) comprises receiving one or more frequencies of the spectrum of light at the second blade; and step (c) comprises calculating the tip angle based upon the frequency of the detected light. The respective frequencies spread out spatially moving from the first blade towards the second blade. Preferably, the light is in the visible range and the different frequencies are different colours of visible light. The larger the separation between the blades, the higher the spatial resolution of the frequencies, which results in more accurate measurements. This improves the detection of the different spectrum component frequencies and/or colours.

Step (a) may further comprise forming the spectrum of light by refracting white light using a prism. Since each component of the white light is refracted by a different amount, it is possible to determine the blade tip angle on the basis of the detected colour of light, as this is proportional to the blade tip angle.

In certain embodiments the method further comprises: transmitting light from a plurality of transmitters spaced apart along the length of the first blade; receiving the light from the plurality of transmitters at one or more receivers on the second blade; and determining the twist and/or load along the first blade on the basis of characteristics of the received light. The presence of a plurality of spaced apart transmitters and/or receivers enables the pitch angle of the blade to be determined as a function of the blade's length. Since the pitch angle may be affected by blade twist and/or load, this enables the twist and/or load of the blade to be determined as it varies along the blade's length. This feature may be used for diagnostic purposes and to ensure that the blade is operated under optimal load conditions, minimising the likelihood of structural rupture.

The light from each transmitter may be received by the same receiver or different receivers.

In cases where the light from multiple transmitters is received by the same receiver preferably, each transmitter transmits light having a unique frequency or a unique range of frequencies that is different to the frequencies transmitted by the other transmitters; and/or each transmitter may transmit light having a unique polarisation that is different to the polarisation of light transmitted by the other transmitters. This provides a means for discriminating between the light emitted by different transmitters located at different lengths along the blade, facilitating the calculation of the blade tip angle at a specific point along the blade's length.

A second aspect of the invention relates to a wind turbine comprising: a rotor having a plurality of blades; a light source; a transmitter provided on a first blade of the rotor, the transmitter being arranged to transmit a light signal from the light source towards a second blade of the rotor; a receiver provided on the second blade, the receiver being arranged to receive the light signal transmitted from the first blade; a detector for detecting the received light signal; and a processor in communication with the detector and arranged to calculate the tip angle of the first or second blade based upon characteristics of the detected light signal or parameters derived from the detected light signal.

The transmitter may comprise one or more lenses for directing the light signal towards the receiver, and the receiver may comprise one or more lenses for receiving the light signal.

The light source may be located remotely from the transmitter, for example inside the hub, and the wind turbine may comprise a first optical fibre extending longitudinally along the first blade between the light source and the transmitter. The lack of electrically conducting material within the blade makes the blade less susceptible to lighting strikes.

The detector is preferably located remotely from the receiver, for example in the hub, and the wind turbine may further include a second optical fibre extending longitudinally along the second blade between the detector and the receiver.

The wind turbine may comprise first and second transmitters located near the tip of the first blade and spaced apart in the chordwise direction of the first blade, the first and second transmitters being arranged respectively to transmit first and second substantially identical light signals towards the receiver on the second blade, wherein the first and second light signals interact to form an interference signal. The characteristics of the interference signal will be dependent on the presence and characteristics of any optical path difference present between the first and second light signals.

The first transmitter may be located substantially at the leading edge of the blade and the second transmitter may be located substantially at the trailing edge of the blade. This improves the accuracy of the determined blade tip angle.

The first optical fibre may branch into first and second secondary optical fibres associated respectively with the first and second transmitters. This configuration of optical fibres provides for a single initial light signal to be bifurcated into two substantially identical signals, which are subsequently transmitted by the first and second optical transmitters. This helps to maintain coherency and monochromaticity in the emitted first and second light signals.

The first optical fibre may branch at a point close to the tip of the first blade, to minimise the likelihood of an optical path difference being introduced by the branch between the first and second light signals.

The wind turbine may comprise first and second receivers located near the tip of the second blade and spaced apart in the chordwise direction of the second blade. Preferably, the first receiver is located substantially at the leading edge of the blade and the second receiver is located substantially at the trailing edge of the blade. This improves the accuracy with which the tip angle of the second blade may be calculated.

The first and second receivers are preferably arranged to convert the received light signal into first and second light signals which interact to form an interference signal.

Preferably, the frequency of light emitted by the light source can be varied between a first frequency and a second frequency. As the frequency is varied, the characteristics of the interference signal also vary, wherefrom the blade tip angle may be calculated.

The interference signal may comprise a series of flashes caused by constructive and destructive interference occurring between the first and second light signals when the frequency of the transmitted light signal is varied from a first frequency to a second frequency.

The processor is preferably configured to determine the blade tip angle on the basis of a determined optical path difference between the first and second signals.

The processor may be configured to determine the blade tip angle on the basis of a counted number of flashes associated with the interference signal when the frequency of the transmitted light is varied from the first frequency to the second frequency. Alternatively, the processor may be configured to determine the blade tip angle on the basis of the frequency of flashes occurring in the interference signal when the frequency of the transmitted light signal is varied from the first frequency to the second frequency. Each flash is associated with an amplitude peak of the interference signal. Accordingly, it is possible to determine the change in the number of wave cycles associated with varying the frequency from the first frequency to the second frequency, wherefrom the total optical path difference may be determined. This enables calculation of the blade tip angle.

In certain embodiments, the wind turbine comprises a transmitter arranged to transmit a spectrum of light from the first blade towards the second blade; the receiver is arranged to receive one or more frequencies/colours of the spectrum of light at the second blade; the detector is arranged to detect the frequency/colour(s) of the received light; and the processor is configured to calculate the tip angle based upon the frequency/colour(s) of the detected light.

The transmitter may be configured to cause the respective frequencies/colours to spread out spatially moving from the first blade towards the second blade, to facilitate detection of the different frequencies/colours at the second blade.

The light source may be a source of white light and the transmitter may comprise a prism for refracting the white light to produce the spectrum of light in the form of a rainbow.

The wind turbine may comprise a plurality of transmitters spaced apart along the length of the first blade, to enable the pitch angle of the blade to be determined at different positions along the length of the blade.

Each transmitter may be configured to transmit light having a unique frequency or a unique range of frequencies that is different to the frequencies transmitted by the other transmitters. Each transmitter may be configured to transmit light having a unique polarisation that is different to the polarisation of light transmitted by the other transmitters. This enables the signals emitted by the different transmitters to be distinguished by the receiver.

FIGURES

FIGS. 1, 2a and 2b have already been described by way of background to the present invention in which:

FIG. 1 is a perspective illustration of an exemplary wind turbine blade having a circular cross-section at the root, and an airfoil cross-section profile outboard from the root; and FIG. 2a is a schematic illustration of the cross-section of the tip of the blade of FIG. 1 having a blade tip angle of 0 radians; whilst FIG. 2b illustrates a blade tip angle of θ>0 radians.

Embodiments of the invention will now be described by way of non-limiting example only with reference to the following figures, in which:

FIG. 5a illustrates the conditions required for constructive interference and FIG. 5b illustrates the conditions required for destructive interference;

FIG. 6b shows how the points A-B-B' form a right angled triangle when certain specific approximations are made;

Figure 3:
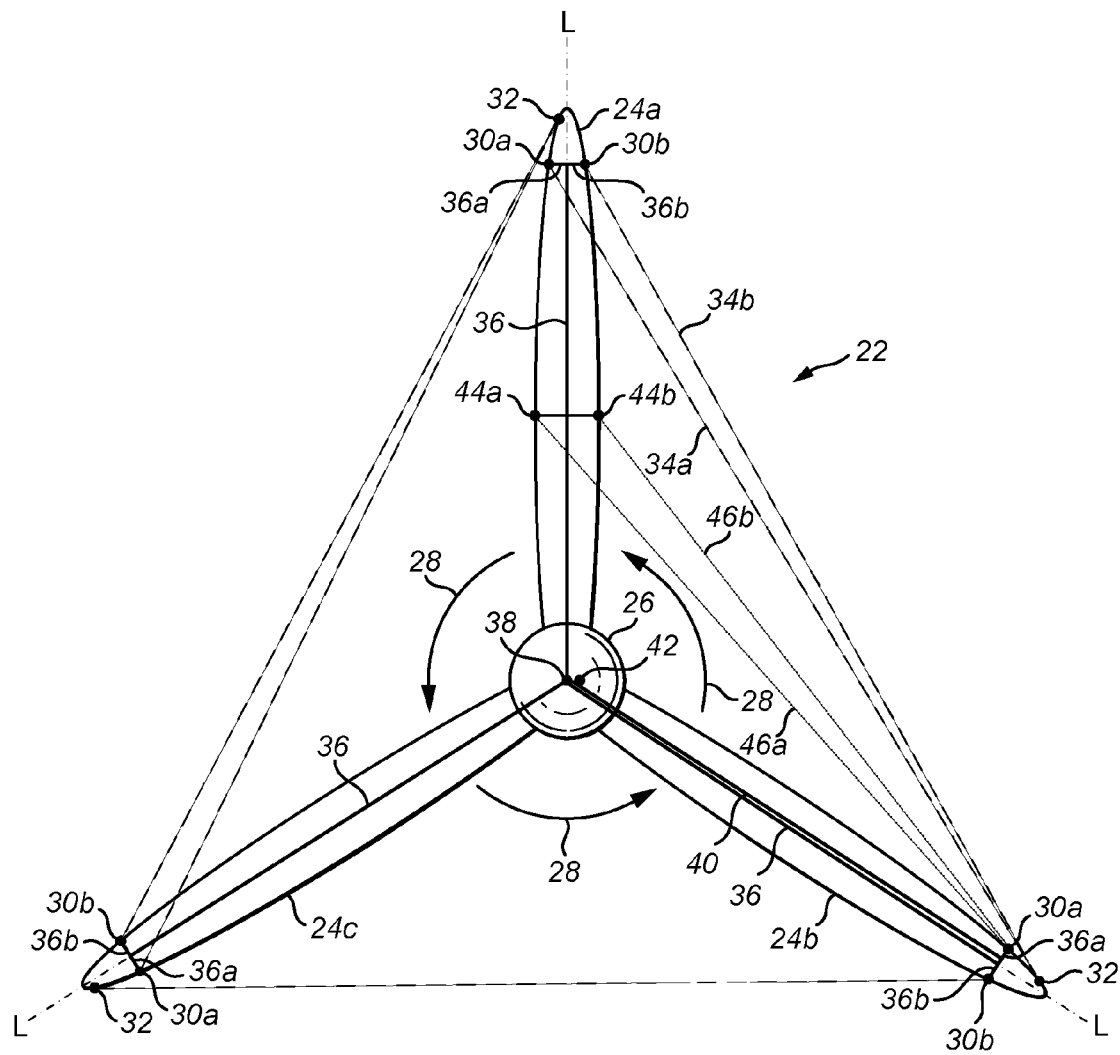
FIG. 3 is a perspective front view schematic illustration of a rotor-hub assembly as used in a horizontal axis wind turbine, configured in accordance with an embodiment of the invention.
Figure 4:
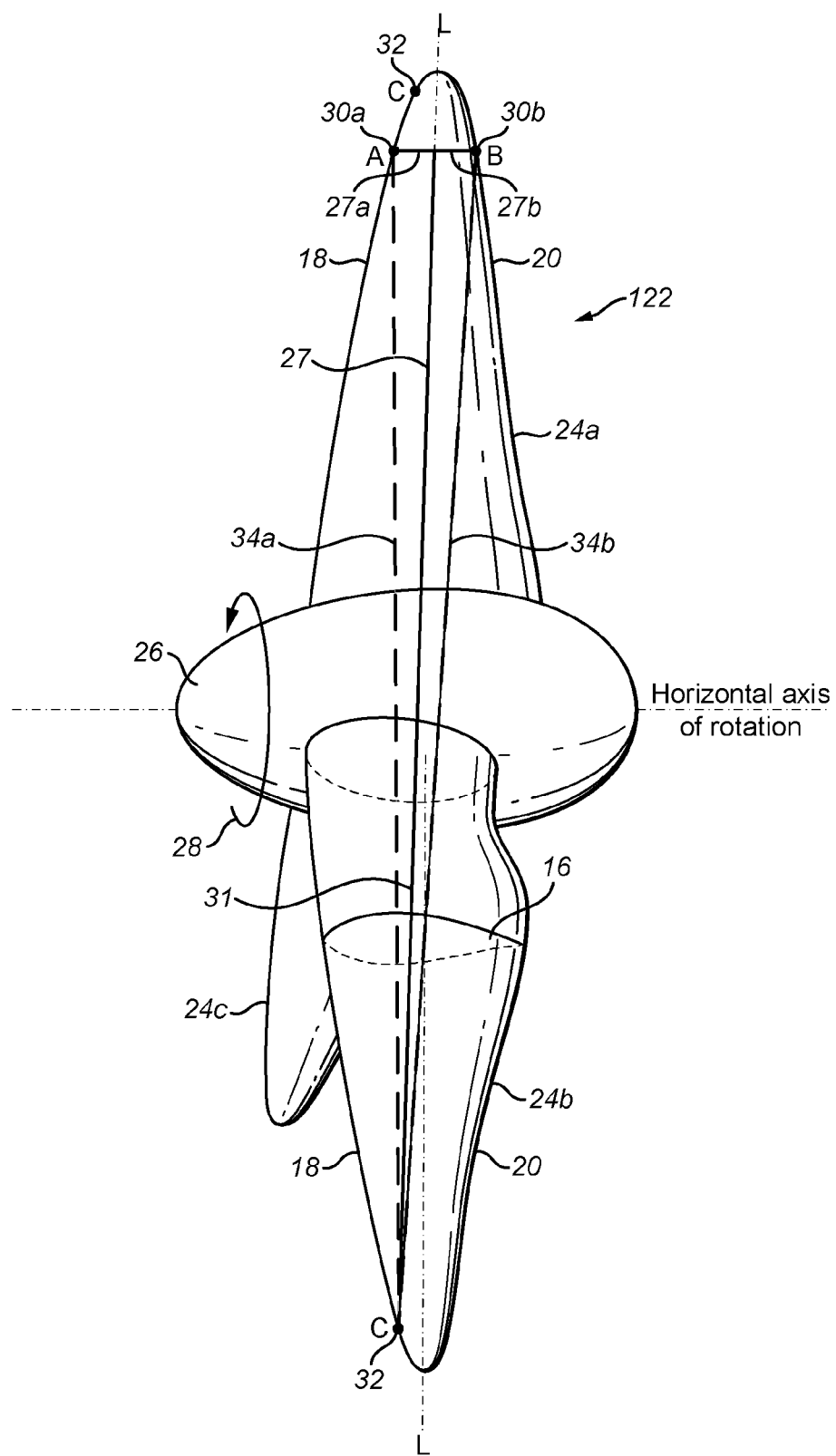
FIG. 4 is a perspective side view schematic illustration of the rotor-hub assembly of FIG. 3.
Figure 6A:
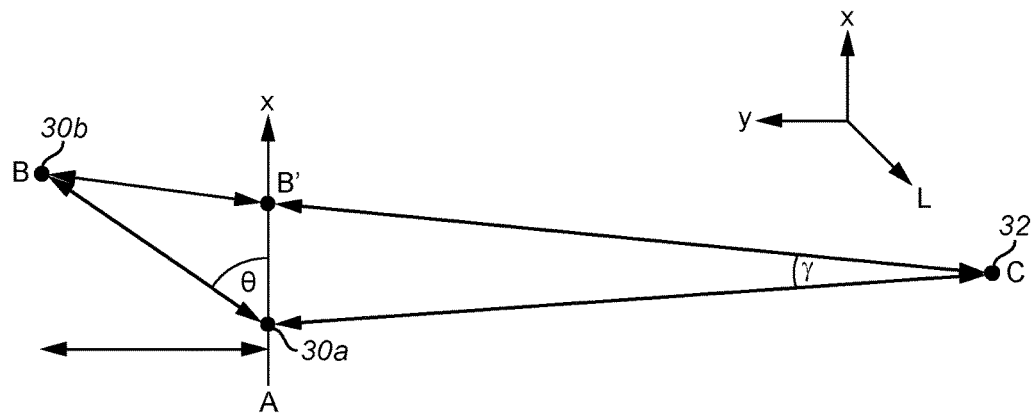
FIGS. 6a and 6b are schematic illustrations showing how an optical path difference is introduced with respect to an optical receiver located on the second blade when the first blade tip of FIGS. 3 and 4 is rotated relative to the x-axis.
Figure 6B:
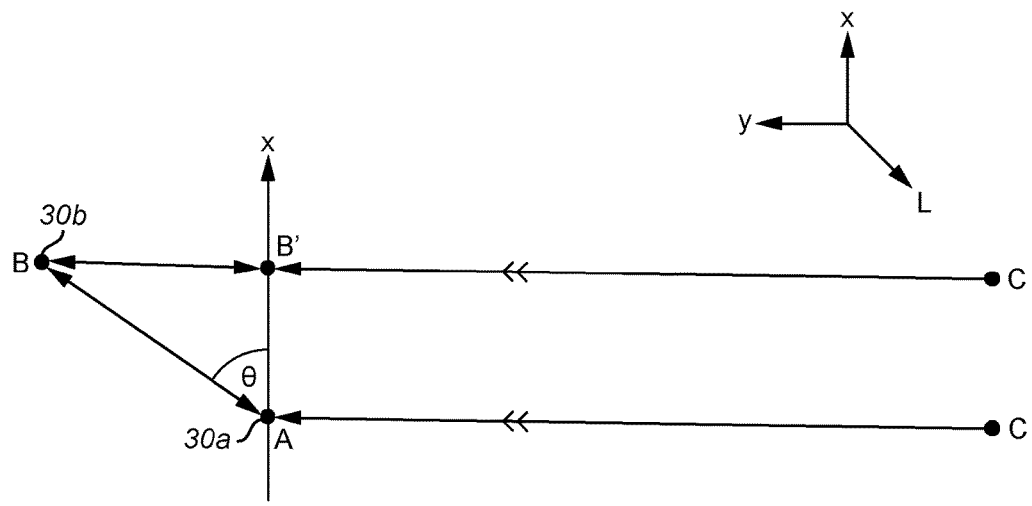
Figure 7A:
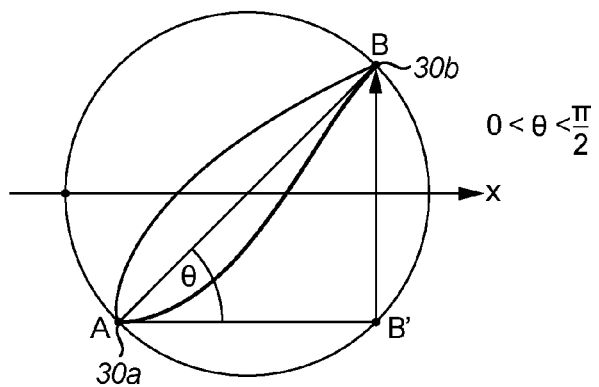
Figure 7B:
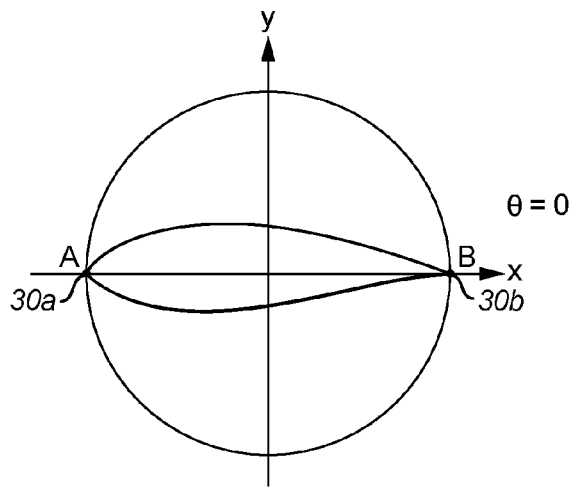
Figure 7C:
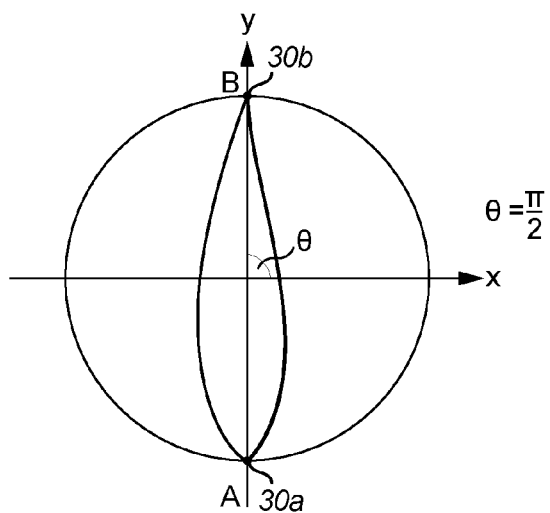

FIGS. 7a, 7b and 7c illustrate the right angled triangle A-B-B' of FIG. 6b presented within a circle having a diameter equal to the physical distance of separation of the two optical transmitters located on the first blade of FIG. 3 or 4, and illustrate how the blade tip angle is associated to the optical path difference by a sinusoidal trigonometric function; FIG. 7a illustrates the right angled triangle A-B-B' formed when the blade tip angle lies within the range $$0 < \theta < \frac{\pi}{2}$$

radians; FIG. 7b shows the horizontal chord A-B formed when the blade tip angle is 0 radians; and FIG. 7c shows the vertical chord A-B formed when the blade tip angle is $$\frac{\pi}{2}$$

radians; and

Figure 8:
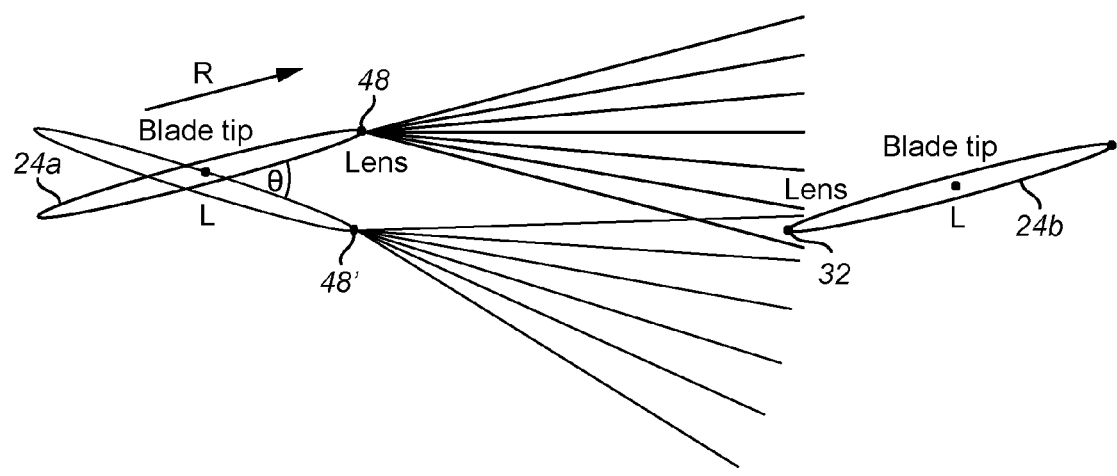

FIG. 8 is a schematic illustration of an alternative embodiment showing how the diffraction of white light is used to determine the blade tip angle of a first blade.

DETAILED DESCRIPTION

Figure 1:
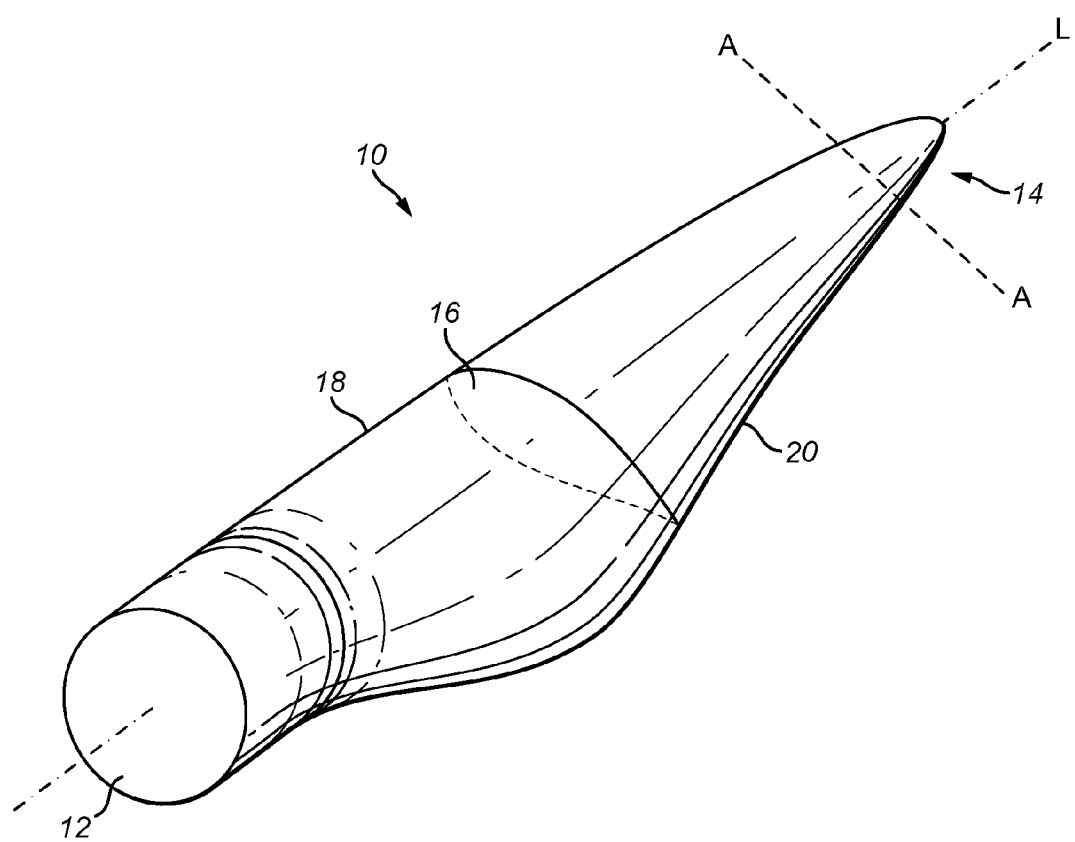
Figure 2A:
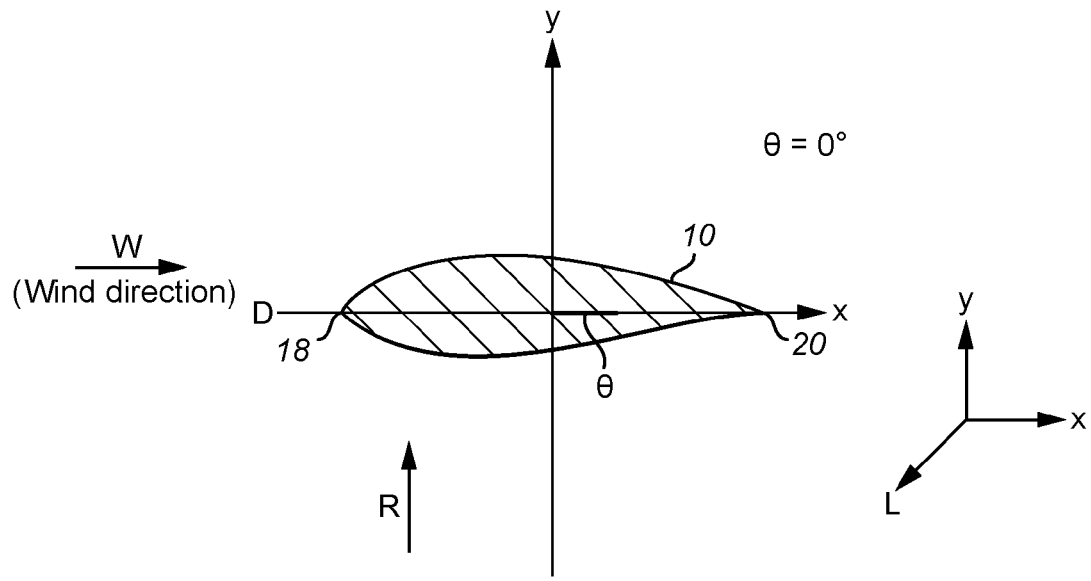
Figure 2B:
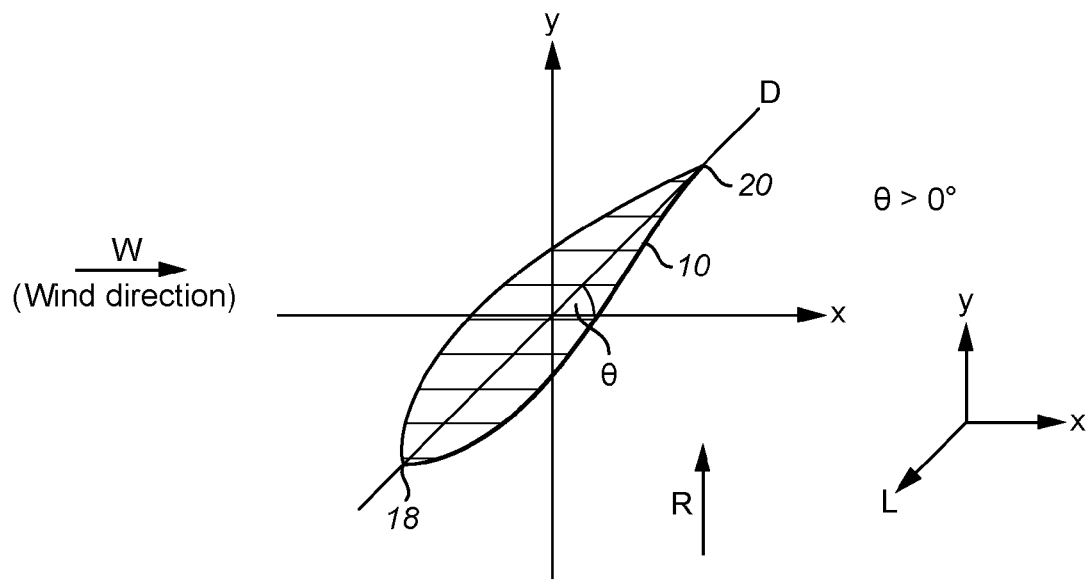

FIG. 3 schematically illustrates a rotor-hub 22 assembly as featured in a horizontal axis wind turbine. The illustrated rotor-hub assembly 22 comprises three turbine blades 24a, 24b, 24c affixed to a central hub 26 via a pitch mechanism (not illustrated). The blades 24a, 24b, 24c have a cross-sectional profile 16 as illustrated in FIG. 1, and are arranged to cause an anti-clockwise rotation of the rotor-hub, as indicated by the directional arrows 28, when wind is incident on the blades 24a, 24b, 24c in a substantially planar direction perpendicular to and into the plane of the page.

FIG. 4 is a side view of the rotor-hub assembly 22 of FIG. 3.

Each blade 24a, 24b, 24c of the rotor-hub 22 assembly is configured with at least two optical transmitters 30a, 30b (also labelled 'A' and/or 'B'), and at least one optical receiver 32 (also labelled 'C'). A first one of the optical transmitters 30a is arranged on the leading edge 15 of the blade 24a, 24b, 24c, and a second one of the optical transmitters 30b is arranged on the trailing edge 17. The first and second optical transmitters 30a, 30b are separated in a chordwise direction of the blade 24a, 24b, 24c, which is substantially perpendicular to the longitudinal axis L of the blade. The optical transmitters 30a, 30b are located substantially in the vicinity of the tip of the blade 24a, 24b, 24c, to enable accurate determination of the pitch angle θ of the blade tip.

The at least two optical transmitters 30a, 30b located on a first blade 24a are each configured to emit a light signal 34a, 34b, which is subsequently received by the optical receiver 32 ('C') located on a second adjacent blade 24b. The light signals 34a, 34b are coherent and monochromatic, such that the two emitted signals 34a, 34b interfere constructively and/or destructively resulting in an interference signal formed at the optical receiver 32 ('C'). The tip angle of the first blade 24a relative to the second blade 24b is calculated on the basis of the characteristics of the detected interference signal, as will now be explained in detail with reference to the remaining figures.

Figure 5A:
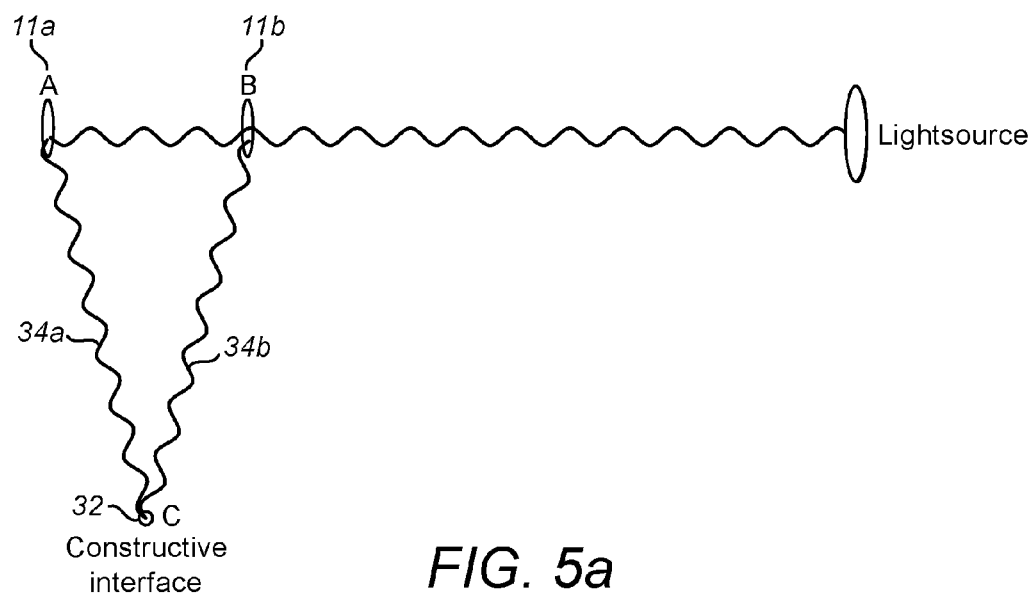
FIGS. 5a and 5b are schematic illustrations of the principal of optical interference used by the rotor-hub assembly of FIG. 3 to determine blade tip angle.
Figure 5B:
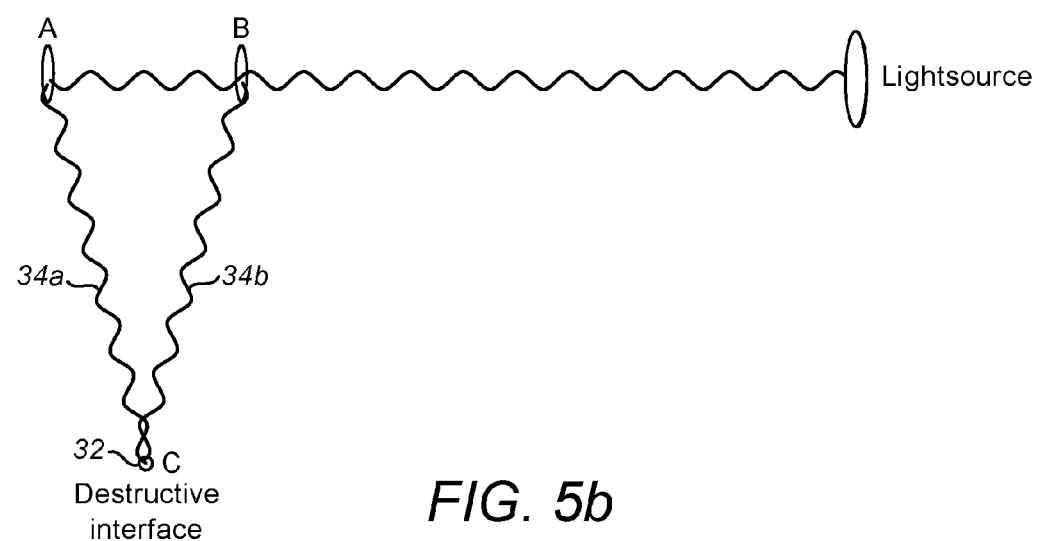

FIGS. 5a and 5b are schematic illustrations of the principle of optical interference, which is used in order to determine the tip angle θ of the first blade. The two emitted signals 34a, 34b interfere constructively when the optical path difference d between the two emitted light signals 34a, 34b is a whole-integer multiple of the wavelength of the emitted signals 34a, 34b,
i.e.

$$d = \frac{n\lambda}{2}; n = 2, 4, 6 \ldots \qquad \text{eq. 1.0}$$

where λ is the wavelength of the two monochromatic signals 34a, 34b.

In other words, the signals interfere constructively when the signals are in phase. Points of constructive interference are associated with intensity amplitude peaks or maximas in the detected interference signal. These intensity peaks are equivalent to the bright fringes present in optical interference patterns, and will interchangeably be referred to as such in the ensuing description.

Similarly, the two emitted signals 34a, 34b interfere destructively when the optical path difference d between the two signals is a half-integer multiple of the wavelength, i.e.

$$d = \frac{n\lambda}{2}; n = 1, 3, 5 \ldots \qquad \text{eq. 1.1}$$

where λ is the wavelength of the two monochromatic signals 34a, 34b.

In other words, the signals interfere destructively when the signals are exactly out of phase. Points of destructive interference are associated with intensity amplitude troughs or minimas in the detected interference signal, and are equivalent to the dark fringes present in the optical interference patterns.

An optical intensity maxima is measured by the optical receiver 32 when the position of an amplitude peak of the interference signal is coincident with the position of the optical receiver 32, as illustrated in FIG. 5a. An optical intensity minima is measured by the optical receiver 32 when an amplitude trough is coincident with the position of the optical receiver 32, as illustrated in FIG. 5b.

The positions where amplitude peaks and troughs form relative to the optical receiver 32 vary as the optical path difference between the two emitted signals 34a, 34b varies. The optical path difference is dependent on the difference in distance of the two optical transmitters 30a, 30b from the optical receiver 32, which varies with the tip angle θ.

FIG. 6a is a schematic illustration showing how an optical path difference is introduced when the first blade tip is rotated relative to the x-axis. The positions of the two optical transmitters 30a, 30b are illustrated with respect to the position of the optical receiver 32. The optical path difference is represented by the line segment B-B'. The real physical distance of separation between the two optical transmitters 30a, 30b is represented by the line segment A-B. The line segments A-C and B'-C are equal in length (i.e. A-C=B'-C). The optical path difference B-B' is the additional distance that the second signal 34b emitted from the second optical transmitter 30b travels to the optical receiver 32 with respect to the first signal 34a emitted from first optical receiver 34a. When this optical path difference is a whole integer multiple of the emitted wavelength, as indicated in equation 1.0, an amplitude peak is formed at the optical receiver 32. When the optical path difference is a half integer multiple of the wavelength, as indicated in equation 1.1, an amplitude trough is formed at the optical receiver 32.

Since the line segments A-C and B'-C are significantly larger than the line segment A-B, it is possible to assume that the line segments A-C and B'-C are substantially parallel in orientation, since the angle of divergence of the two line segments γ is very small. FIG. 6b illustrates line segments A-C and B'-C being substantially parallel in orientation. On the basis of this assumption, the lines A-B-B' form a right-angled triangle having an angle of divergence from the x-axis of θ.

FIGS. 7a, 7b, and 7c illustrate the right-angled triangle A-B-B' plotted on a circle having a diameter equal to the line A-B (the diameter is equal to the physical distance of separation between the optical transmitters), for different values of the blade tip angle θ.

FIG. 7a illustrates the right-angled triangle formed for a blade tip angle lying within the range 0<θ<π/2. The optical path difference B-B' is then given by the following equation $$\text{optical path difference} = AB \sin(\theta) \qquad \text{eq.2.0}$$

where AB is the distance of separation of the optical transmitters 30a, 30b.

In practice, the blade tip angle θ is likely to be restricted within the range $$0 \leq \theta \leq \frac{\pi}{2}.$$

This gives rise to two extreme scenarios, illustrated respectively in FIGS. 7b and 7c.

FIG. 7b illustrates the scenario where the blade tip angle is 0, in which case the optical path difference, determined using equation 2.0 is zero, and both A and B are equidistant from the optical receiver C.

FIG. 7c illustrates the scenario where the blade tip angle is $$\frac{\pi}{2},$$

in which case the optical path difference is equal to the physical distance of separation of A and B.

Equation 2.0 may be re-expressed as follows:

$$\sin(\theta) = \frac{\text{optical path difference}}{AB} \qquad \text{eq. 2.1}$$

The tip angle θ, defined with respect to the direction of rotation R, is given by the inverse sine of the ratio of the optical path difference to the real physical distance of separation between the optical transmitters:

$$\theta = \arcsin\left(\frac{\text{optical path difference}}{AB}\right) \qquad \text{eq. 2.2}$$

The physical distance of separation AB between the optical transmitters in the chordwise direction along a blade 24a, 24b, 24c is constant, and is accurately measured when the transmitters are installed on the blade.

The optical path difference is determined empirically using the optical transmitters 30a, 30b and the optical receiver 32, by analysing the characteristics of the interference signal measured at the optical receiver 32 as will now be explained. In the first embodiment, the first blade 24a is arranged relative to the second blade 24b such that there is an optical path difference between the first and second optical transmitters 30a, 30b (e.g. as illustrated in FIG. 7a). The wavelength and/or frequency of the first and second emitted coherent light signals 34a, 34b is then varied by a known amount. Varying the wavelength and/or frequency causes the position of the interference fringes relative to the optical receiver 32 to be shifted. For example, the frequency of the first and second emitted coherent light signals 34a, 34b may be varied from a first known frequency to a second known frequency different to the first frequency. Assuming that the optical path distance is constant as the wavelength and/or frequency is varied, the total number of counted shifted bright or dark interference fringes is proportional to the change in frequency. This is illustrated in further detail in the below example, provided for illustrative purposes only. It is to be noted that since frequency and wavelength are proportional, a variance in the frequency will result in an inversely proportional variance in the wavelength. In other words, increasing the frequency by 1% results in a 1% decrease in wavelength, and vice versa.

Assuming that the optical path difference between the two signals is 100 mm, and the wavelength of the emitted coherent light signals is 1 μm, then there are 100,000 wave cycles (e.g. 100 mm/1 μm=100,000 wave cycles) within the optical path difference, where each wave cycle relates to an amplitude oscillation over 2π. In other words, there are 100,000 additional cycles between the second transmitter 30b and the optical receiver 32, compared to the number of wave cycles between the first transmitter 30a and the optical receiver 32. Therefore, a ¹⁄₁₀₀,₀₀₀ (10 ppm) decrease in the wavelength of the first and second emitted signals 34a, 34b results in one additional wave cycle present in the optical path difference. Similarly, a ¹⁄₁₀₀,₀₀₀ (10 ppm) increase in the wavelength of the emitted signals results in one less wave cycle present in the optical path difference.

Similarly, a 1% (10,000 ppm) change in the frequency of the emitted first and second signals 34a, 34b, results in a change of 1,000 wave cycles between the first and second optical transmitters 30a, 30b. For example, if the frequency is increased by 1% (corresponding to a 1% decrease in wavelength), then an additional 1,000 wave cycles will be present within the optical path difference, whereas if the frequency is decreased by 1% (corresponds to a 1% increase in wavelength) this will result in 1,000 fewer wave cycles present within the optical path difference. Either way, and provided that the optical receiver 32 is configured to measure optical intensity (e.g. optical irradiance), 1,000 bright fringes will shift across the optical receiver 32. This manifests itself as a 'blinking' or 'flashing' interference signal, which would blink and/or flash 1,000 times as the frequency is varied from the first to the second frequency. The number of measured amplitude peaks (i.e. bright interference fringes) is proportional to the change in frequency (or equivalently the change in wavelength).

The total number of wave cycles present within the optical path difference may be determined knowing the wavelength and/or frequency of the emitted monochromatic light, the amount by which the frequency/wavelength was varied, and the resulting change in number of wave cycles. If a 1% change in frequency resulted in a change of 1,000 wave cycles, then the originally present number of wave cycles in the optical path distance was 100,000. The optical path difference may then be determined knowing the wavelength—specifically, by dividing the total number of wave cycles by the wavelength.

In summary, the optical path difference is determined by controllably varying the frequency (and therefore the wavelength) by a known amount, and observing the number of flashes and/or blinks in the received interference signal that occurs when the frequency of the emitted signals is varied. This provides a quantifiable association between the characteristics of the emitted signals 30a, 30b and the number of observed bright interference fringes, wherefrom the optical path difference is calculated.

Once the optical path difference has been determined, then the blade tip angle θ may be determined using equation 2.2.

In practice, the blade tip angle θ may be determined whilst the rotor is either in use or stationary. Since there is no relative motion between the first and second blades 24a, 24b, Doppler effects are not observed, and can be ignored for present purposes. The blade tip angle θ of the first blade 24a is determined by emitting a monochromatic light signal from respectively the first and second optical transmitters 30a, 30b, controllably varying the frequency/wavelength of the emitted light signals by a known amount, and counting the number of bright fringes measured at the optical receiver 32, in order to determine the optical path distance as described previously. The tip angle θ is then determined using equation 2.2.

In use, the optical transmitters 30a, 30b may be configured to continuously emit monochromatic light signals 34a, 34b, in order to measure the blade tip angle θ continuously;

or alternatively, the optical transmitters 30a, 30b may be activated when precise blade tip measurement is required.

In order to avoid electrically conducting material present within the blades 24a, 24b, 24c, optical fibres are used to transmit optical signals from a coherent light source located inside the hub to the optical transmitters 30a, 30b located substantially in the vicinity of the blade tips.

For example, each blade 24a, 24b, 24c is provided with an optical fibre 36 extending longitudinally along the blade in a direction substantially parallel to the longitudinal axis L, as illustrated in FIGS. 3 and 4. The optical fibre is operatively coupled to a coherent, monochromatic light source 38 located in the hub 26, at one end. In the vicinity of the optical transmitters 30a, 30b, the optical fibre is arranged to bifurcate into two separate component fibres 36a, 36b, with each component delivering a coherent light signal to a different one of the optical transmitters 30a, 30b. The bifurcation is arranged such that the two separate fibre components 36a, 36b do not introduce an optical path difference. This ensures that the two light signals 34a, 34b emitted from each optical transmitter 30a, 30b are coherent and in phase. As the rotor turns, any phase difference observed at the optical receiver 32 is therefore due to an optical path difference resulting from a difference in the relative distances of the optical transmitters 30a, 30b from the optical receiver 32.

The optical receiver 32 located on each blade 24a, 24b, 24c is also operatively coupled to an optical fibre 40, such that a received optical signal, which signal will be the superposition of the first and second signals 34a, 34b, is transmitted to an optical sensor 42, located remotely from the optical receiver 32. As mentioned previously, the use of optical fibres avoids electrically conducting material located in the blades 24a, 24b, 24c, which would be susceptible to lightning strikes in adverse weather conditions. The remotely located optical sensor 42 is located within the hub 26 in this example, and is configured to measure optical irradiance (i.e. optical intensity). The optical sensor 42 is connected to a processor arranged to count interference fringes, in order to enable determination of the optical path distance as previously described.

Alternatively, the processor may be arranged to calculate the Fast Fourier Transform (FFT) in order to determine a blinking frequency, which is defined as the number of counted bright interference fringes occurring within a unit of time. The blinking frequency can then be used to determine the total number of blinks which is associated to the change in optical path. The blade tip angle may then be calculated as described previously. Use of the FFT is particularly advantageous to measure weak and/or noisy signals emitted from the optical transmitters.

For clarity purposes, FIG. 4 illustrates the first blade 24a comprising the optical transmitters 30a, 30b and associated optical fibres 36, 36a, 36b; and the second blade 24b is illustrated as comprising only the optical receiver 32 and its associated optical fibre 40. However, it is to be appreciated, and as illustrated in FIG. 3, that each blade 24a, 24b, 24c in this example comprises both optical transmitters 30a, 30b and associated optical fibres 36, 36a, 36b; and an optical receiver 32, and associated optical fibre 40.

In a further embodiment, each blade 24a, 24b, 24c is provided with more than one pair of optical transmitters, each pair of optical transmitters being located at a different position along the longitudinal axis L of a blade 24a, 24b, 24c.

For example, FIG. 3 illustrates the first blade 24a comprising two pairs of optical transmitters 30a, 30b, 44a, 44b. The second pair of optical transmitters 44a, 44b are located at a different position along the longitudinal axis L of the first blade 24a, with respect to the first pair of optical transmitters 30a, 30b. This configuration of optical transmitters enables the pitch of the first blade 24a, to be determined at different longitudinal positions. This is advantageous when the pitch of the first blade 24a varies along its longitudinal axis L. This might occur when the first blade 24a is subject to high stresses, in which case the pitch or blade tip angle may vary along the blade's longitudinal axis L.

Different methods may be used to distinguish between the light signals 34a, 34b emitted from the first pair of optical transmitters 30a, 30b, and the light signals 46a, 46b emitted from the second pair of optical transmitters 44a, 44b. For example, polarization effects can be used to distinguish between the two pairs of light signals 34a, 34b, and 46a, 46b. Each pair of emitted lights signals 34a, 34b and 46a, 46b is polarised by a different amount, and the emitted signals are distinguished on the basis of their polarisation. For example, the first pair of emitted light signals 34a, 34b may be linearly polarised in the vertical direction, whilst the second pair of emitted light signals 46a, 46b may be linearly polarised in the horizontal direction. A polarization filer located at either the optical receiver 32, or the optical sensor 42, is used to distinguish between the interference signals resulting from each different pair of received optical signals 34a, 34b, 46a, 46b.

Alternatively, wave-plates may be used to introduce a relative phase difference between the two pairs of emitted light signals 34a, 34b, 46a, 46b. The relative phase difference is maintained in the resulting received interference signal, and is used to distinguish between the interference signal resulting from the first pair of emitted light signals 34a, 34b and the second pair of emitted light signals 46a, 46b. The use of wave-plates is advantageous since it does not reduce the intensity of the emitted light signals.

Alternatively, each blade 24a, 24b, 24c may be provided with a plurality of different optical receivers, each different receiver being arranged to measure the interference signal generated by a different pair of optical transmitters. For example, each different receiver is provided with a polarisation filter enabling the required interference signal to be measured, whilst filtering out the other interference signals.

In accordance with a further variant, each blade 24a, 24b, 24c is provided with a single optical transmitter, and two optical receivers. This variant may be envisaged with reference to FIGS. 3 and 4, in which the positions of the optical transmitters and the optical receivers are interchanged. The position of the optical transmitters 30a, 30b are now associated with first and second optical receivers; and the position of the optical receiver 32 is now associated with the position of an optical transmitter. A single signal is emitted from the single optical transmitter. This signal is received by both the first and second optical receivers, generating first and second measured signals at respectively the first and second optical receivers 30a, 30b. The first and second measured signals are associated with the signals 34a, 34b in this example. The measured signals will be in phase if no optical path difference is present between the receivers 30a, 30b relative to the transmitter 32, in which case both measured signals are identical. When the two measured signals 34a, 34b are superimposed at the junction of the first and second optical fibre components 36a, 36b, the first and second measured signals 34a, 34b will interfere constructively. If instead an optical path difference is present between the first and second optical receivers 11a, 11b with respect to the optical transmitter 32, then a relative phase difference will exist between the first and second measured signals 34a, 34b, which will result in constructive or destructive interference depending on the relative phase difference between the two signals when the two signals are superimposed at the junction of the first and second fibre components 36a, 36b. The resulting interference signal is measured at the optical sensor 42. The blade tip angle is calculated in the same manner as described previously.

In accordance with a further variant, the principle of refraction is used to determine the blade tip angle of a first blade relative to a second blade. FIG. 8 is a schematic illustration of this embodiment. Cross sections through a blade tip taken in a plane perpendicular to the longitudinal axes L of the blades are illustrated. The optical transmitter 48 of the first blade 24a is configured with an optical refracting element, such as a prism, arranged to refract different wavelengths and/or frequencies of light by different angles relative to the second blade 24b. When substantially white light is transmitted through the optical transmitter 48, the refractive element refracts the different wavelength and/or frequency components of the incident white light by different angles relative to the second blade 24b, such that a spectrum (i.e. a rainbow) of different coloured light (each different wavelength and/or frequency component will appear as a different colour of light) is emitted from the optical transmitter 48. The blade tip angle θ of the first blade 24a is determined from the wavelength and/or frequency of the light signal measured by the optical receiver 32 located on the second blade 24b.

As the orientation of the first blade 24a varies relative to the second blade 24b, and a blade tip angle θ is introduced, the position of the optical transmitter 48' relative to the optical receiver 32 changes. As a result of this relative change in position, the wavelength and/or frequency of the signal received by the optical receiver 32 changes.

The positional relationship between the first and second blades 24a, 24b is calibrated to define a reference signal with respect to which subsequent blade angle tip calculations are defined. For example, when the blade tip angle of the first blade 24a is 0 radians, the second blade 24b measures a specific colour of light, which is used to define a reference signal with respect to which all subsequent blade tip angles are determined. As the blade tip angle θ changes, so too does the position of the optical transmitter 48' relative to the optical receiver 32. As a result of this, the optical receiver 32 measures a different wavelength and/or frequency component of the emitted light as a function of the blade tip angle θ. Since the diffraction characteristics of the diffraction element are known, the angular diffraction of the measured wavelength component is determined with respect to the reference signal. The blade tip angle is then directly proportional to the diffraction angle associated with the measured wavelength component.

The herein described embodiments may be used in pitch control strategies and/or to control stress loads on the blade.

It is to be appreciated that equations 2.0, 2.1 and 2.2 are valid for right-angled triangles. Use of these equations provides an approximate value for the blade tip angle, where the triangle A-B-B' may be approximated as a right-angled triangle. This approximation does not introduce excessive errors in the calculated blade tip angle, when the angle of divergence γ between line segments C-B and C-B' is very small. This occurs where the distance of separation between the two adjacent turbine blades 24a, 24b is much larger than the physical distance of separation between the optical transmitters positioned at A and B respectively. In practice, as can be seen from FIG. 6a, the triangle A-B-B' is not a right-angled triangle.

The present method may still be used to determine blade tip angle even where the approximations underlying equations 2.0, 2.1 and 2.2 do not hold. In these circumstances known trigonometric relationships applicable to non-right-angled triangles may be used. For example, any one or more of the law of sines, the law of cosines, the law of tangents and the law of cotangents may be used to determine the blade tip angle, or any other known trigonometric equation valid for non-right angled triangles. Since the aforementioned trigonometric laws are well known in the art, it is unnecessary to provide a detailed discussion thereof here.

The present method may be used to calculate the blade tip angle for a wind turbine comprising any number of turbine blades. Whilst the herein described embodiments relate to a wind turbine comprising three blades, this is non-limiting for illustrative purposes only.

All herein provided embodiments are provided for illustrative purposes only and are not to be construed as limiting to the invention. It is to be appreciated that alternative embodiments are envisaged comprising suitable combinations of features of the previously described embodiments, and such alternatives fall within the scope of the present invention.

What is claimed is:

1. A method of determining the tip angle of a blade of a wind turbine rotor during rotation of the rotor, the method comprising:
    (a) transmitting a light signal from a first blade of the wind turbine rotor towards a second blade of the rotor;
    (b) receiving the light signal at the second blade of the rotor; and
    (c) calculating the tip angle of the first or second blade based upon characteristics of the received light signal.

2. The method of claim 1, wherein step (a) comprises transmitting the light signal from a transmitter located near the tip of the first blade.

3. The method of claim 2, further comprising communicating light to the transmitter from a remotely-located light source via a first optical fibre extending longitudinally along the first blade.

4. The method of claim 1, wherein step (b) comprises receiving the light signal at a receiver located near the tip of the second blade.

5. The method of claim 1 further comprising communicating the received light signal to a remotely-located detector via a second optical fibre extending longitudinally along the second blade.

6. The method of claim 1, wherein:
    step (a) comprises transmitting first and second substantially identical light signals respectively from first and second transmitters, the first and second transmitters being located near the tip of the first blade and spaced apart in the chordwise direction of the first blade; and
    step (c) comprises calculating the tip angle of the first blade.

7. The method of claim 6, wherein step (c) comprises determining the optical path difference between the first and second signals and using the optical path difference to calculate the tip angle.

8. The method of claim 6, wherein:
    step (a) comprises continuously varying the frequency of the transmitted light signal from a first frequency to a second frequency;

step (b) comprises detecting a blinking interference signal caused by constructive and destructive interference occurring between the first and second light signals as the frequency is varied between the first and second frequencies; and step (c) comprises calculating the blade tip angle based upon characteristics of the interference signal detected in step (b).

9. The method of claim 8, wherein step (c) comprises counting the number of blinks that occur in the interference signal when the frequency is varied from the first frequency to the second frequency and calculating the blade tip angle based upon the counted number of blinks.

10. The method of claim 8, wherein step (c) comprises determining the blinking frequency of the interference signal and calculating the blade tip angle based upon the blinking frequency.

11. The method of claim 1, wherein:
step (b) comprises receiving the transmitted light signal at first and second receivers, the first and second receivers being located near the tip of the second blade and spaced apart in the chordwise direction of the second blade; and step (c) comprises calculating the tip angle of the second blade.

12. The method of claim 11, further comprising converting the received light signal into first and second substantially identical light signals.

13. The method of claim 1, wherein:
step (a) comprises transmitting a spectrum of light from the first blade towards the second blade;
step (b) comprises receiving one or more frequencies of the spectrum of light at the second blade; and
step (c) comprises calculating the tip angle based upon the frequency of the detected light.

14. The method of claim 13, wherein the respective frequencies spread out spatially moving from the first blade towards the second blade.

15. The method of claim 13, wherein step (a) further comprises forming the spectrum of light by refracting white light using refracting means such as a prism.

16. The method of claim 1, further comprising:
transmitting light from a plurality of transmitters spaced apart along the length of the first blade and/or receiving transmitted light at a plurality of receivers spaced apart along the length of the second blade; and
determining the twist and/or load along the first blade on the basis of characteristics of the received light.

17. The method of claim 16, wherein the light from each transmitter is received by the same receiver.

18. The method of claim 16, wherein each transmitter transmits light having a unique frequency or a unique range of frequencies that is different to the frequencies transmitted by the other transmitters.

19. The method of claim 16, wherein each transmitter transmits light having a unique polarisation that is different to the polarisation of light transmitted by the other transmitters.

20. A wind turbine comprising:
a rotor having a plurality of blades;
a light source;
a transmitter provided on a first blade of the rotor, the transmitter being arranged to transmit a light signal from the light source towards a second blade of the rotor;
a receiver provided on the second blade, the receiver being arranged to receive the light signal transmitted from the first blade;
a detector for detecting the received light signal; and
a processor in communication with the detector and arranged to calculate the tip angle of the first or second blade based upon characteristics of the detected light signal.

21. The wind turbine of claim 20, wherein the transmitter comprises one or more lenses for directing the light signal towards the receiver, and the receiver comprises one or more lenses for receiving the light signal.

22. The wind turbine of claim 20, wherein the light source is located remotely from the transmitter, and the wind turbine further comprises a first optical fibre extending longitudinally along the first blade between the light source and the transmitter.

23. The wind turbine of claim 20, wherein the detector is located remotely from the receiver and the wind turbine further includes a second optical fibre extending longitudinally along the second blade between the detector and the receiver.

24. The wind turbine of claim 20 comprising first and second transmitters located near the tip of the first blade and spaced apart in the chordwise direction of the first blade, the first and second transmitters being arranged respectively to transmit first and second substantially identical light signals towards the receiver on the second blade, wherein the first and second light signals interact to form an interference signal.

25. The wind turbine of claim 24, wherein the first transmitter is located substantially at the leading edge of the blade and the second transmitter is located substantially at the trailing edge of the blade.

26. The wind turbine of claim 24, wherein the first optical fibre branches into first and second secondary optical fibres associated respectively with the first and second transmitters.

27. The wind turbine of claim 26, wherein the first optical fibre branches at a point close to the tip of the first blade.

28. The wind turbine of claim 20, comprising first and second receivers located near the tip of the second blade and spaced apart in the chordwise direction of the second blade.

29. The wind turbine of claim 28, wherein the first receiver is located substantially at the leading edge of the blade and the second receiver is located substantially at the trailing edge of the blade.

30. The wind turbine of claim 28, wherein the first and second receivers are arranged to convert the received light signal into first and second light signals which interact to form an interference signal.

31. The wind turbine of claim 20, wherein the frequency of light emitted by the light source can be varied between a first frequency and a second frequency.

32. The wind turbine of claim 31, wherein the interference signal comprises a series of flashes caused by constructive and destructive interference occurring between the first and second light signals when the frequency of the transmitted light signal is varied from a first frequency to a second frequency.

33. The wind turbine of claim 32, wherein the processor is configured to determine the blade tip angle on the basis of a determined optical path difference between the first and second signals.

34. The wind turbine of claim 32, wherein the processor is configured to determine the blade tip angle on the basis of a counted number of flashes associated with the interference signal when the frequency of the transmitted light is varied from the first frequency to the second frequency.

35. The wind turbine of claim 32, wherein the processor is configured to determine the blade tip angle on the basis of the frequency of flashes associated with the interference signal when the frequency of the transmitted light signal is varied from the first frequency to the second frequency.

36. The wind turbine of claim 20, wherein:
the transmitter is arranged to transmit a spectrum of light from the first blade towards the second blade;
the receiver is arranged to receive one or more frequencies of the spectrum of light at the second blade;
the detector is arranged to detect the frequencies of the received light; and
the processor is configured to calculate the tip angle based upon the frequencies of the detected light.

37. The wind turbine of claim 36, wherein the transmitter is configured to cause the respective frequencies to spread out spatially moving from the first blade towards the second blade.

38. The wind turbine of claim 36, wherein the light source is a source of white light and the transmitter comprises a prism for refracting the white light to produce the spectrum of light.

39. The wind turbine of claim 20, further comprising a plurality of transmitters spaced apart along the length of the first blade.

40. The wind turbine of claim 39, wherein each transmitter transmits light having a unique frequency or a unique range of frequencies that is different to the frequencies transmitted by the other transmitters.

41. The wind turbine of claim 39, wherein each transmitter transmits light having a unique polarisation that is different to the polarisation of light transmitted by the other transmitters.

* * * * *